United States Patent [19]
Jung

[11] Patent Number: 5,507,220
[45] Date of Patent: Apr. 16, 1996

[54] COOKING UTENSIL

[76] Inventor: Kwang S. Jung, 823-16 Hwakok-dong, Kangseo-ku, Seoul, Rep. of Korea

[21] Appl. No.: 256,822

[22] PCT Filed: Nov. 26, 1993

[86] PCT No.: PCT/KR93/00103

§ 371 Date: Jul. 25, 1994

§ 102(e) Date: Jul. 25, 1994

[87] PCT Pub. No.: WO94/12085

PCT Pub. Date: Jun. 9, 1994

[30] Foreign Application Priority Data

| Nov. 26, 1992 | [KR] | Rep. of Korea | 92-23511 |
| Sep. 21, 1993 | [KR] | Rep. of Korea | 93-19086 |
| Sep. 21, 1993 | [KR] | Rep. of Korea | 93-19087 |

[51] Int. Cl.⁶ ............................................. A47J 27/00
[52] U.S. Cl. ..................... 99/403; 99/337; 99/342; 99/422; 126/373; 126/390; 220/316; 220/626; 220/912; 220/408
[58] Field of Search .................... 99/403, 422, 331, 99/337, 338, 410, DIG. 14, 342; 126/373, 390; 220/605, 626, 316, 912, 408

[56] References Cited

U.S. PATENT DOCUMENTS

| 1,152,308 | 8/1915 | Evans | 220/408 |
| 1,648,725 | 11/1927 | Endicott | 99/408 |
| 3,934,748 | 1/1976 | Racz | 220/408 |
| 4,204,607 | 5/1980 | Zani | 220/626 |
| 4,823,980 | 4/1989 | Ejiri | 126/377 |
| 5,012,947 | 5/1991 | Roland | 220/912 |
| 5,031,519 | 7/1991 | Toida et al. | 99/410 |
| 5,125,393 | 6/1992 | Levitin | 126/373 |
| 5,167,216 | 12/1992 | Yeung et al. | 99/403 |
| 5,228,384 | 7/1993 | Kolosowski | 99/342 |
| 5,385,257 | 1/1995 | Hung | 99/403 |
| 5,429,039 | 7/1995 | Chang | 99/337 |

*Primary Examiner*—Timothy F. Simone
*Attorney, Agent, or Firm*—Cushman, Darby & Cushman

[57] ABSTRACT

A cooking utensil having three layer member includes a thermal retaining space between the intermediate member and the outer member, an air passage formed vertically in a part of the circumference between the side walls of the outer member and the intermediate member, and which is communicated with the heat retaining space, and a thermal retaining activator mounted on the exit of the air passage, and which selectively communicates the space with the atmosphere or not. Air in the heat retaining space is heated by heat transmitted from the outer member and the intermediate member made of material having high thermal conductively is indirectly heated by heat transmitted from the air in the space. Therefore heat energy of the intermediate member is uniformly spread out throughout the whole surface thereof so that heat is not focused at any part of the intermediate member and the food in the inner member which is closely contacted with the intermediate member is not scorched or burned.

13 Claims, 6 Drawing Sheets

A

B

COOKING UTENSIL

FIELD OF THE INVENTION

The present invention relates to a cooking utensil, particularly to a cooking ware vessel such as a pot or pan having a heat retaining space throughout a bottom and side wall of the vessel between an inner member and an outer member comprising the vessel.

BACKGROUND OF THE INVENTION

A several type of cooking utensil is known and used in a kitchen and the like.

For example, the cooking utensil is made of clay, cast iron, tin or stainless steel. Then the prior cooking utensil having one layer in bottom and side wall is concentrately heated in a portion directly contacted with the flame of a burner and the like so that the cooking food in the cooking utensil is partially burned. The burned food is not good for health of human body. And in a prior frying pan, a lot of edible oil is required not to burn the cooking food.

In order to solve the above problems, as described in U.S. Pat. No. 4,204,607, a cooking utensil 100 having multi-layer in the bottom 101 is provided as shown in FIG. 10. The bottom 101 of the cooking utensil 100 comprises of a aluminum or copper layer 102 welded to undersurface of the bottom 101 and a stainless steel layer 103 welded to undersurface of the aluminum or copper layer 102.

The cooking utensil 100 having triply layers 101, 102, 103 in the bottom uses the high thermal conductivity of aluminum or copper. That is, the aluminum or copper layer 102 can spread the heat energy outside of the cooking utensil 100 so that heat distribution is uniformly accomplished throughout the bottom 101 of the cooking utensil 100.

The cooking utensil 100 having triply bottom layers 101, 102, 103, however, also can not solve the burning of the cooking food, because the heat from the flame is directly transmitted to the bottom 101 of the cooking utensil 100 having the aluminum or copper layer 102 and the stainless layer 103 directly contacted each other.

Particularly, the burning of the cooking food is seriously occured in the boundary portion between the triply-layer bottom and the side wall having one layer.

Another way to solve the said problem is provided, i.e. materials such as cobalt and aluminum that thermal conductivity is high is used to form the inner member of the cooking utensile or coated on the inner member.

In case of the inner member of the cooking utensile being made of aluminum, since the heat transmission speed is high, the heat transmitted from the undersurface of the bottom of the cooking utensile during cooking with heating means can speedly spread throughout the whole bottom.

Therefore, the food burning problem can be reduced to a certain extent. Some of the food cooked in the cooking utensile get scorched and sticks on the surface of the bottom of the cooking utensile, so the food burning problem can not completely solved with the inner member made of aluminum.

Furthermore, the materials such as cobalt and aluminum are tender so that the inner member can be easily scratched when uses the cooking utensil and cleans it with a scrubber.

In order to solve the prior problem, a cooking utensile having a space between double bottom layers was provided by the inventor of the present invention and published with Korean Utilitymodel Publication No. 93-1765. The prior cooking utensil 200 has, as shown in FIG. 2, a space 201 between a upper bottom layer 202 and a lower bottom layer 203. The lower bottom layer 203 is engaged with the upper bottom layer 202 at the lower portion of the side wall 204 of the cooking utensil 200.

Then, the cooking utensil 200 also has some drawbacks as follows:

1. Since the lower bottom layer 203 is engaged with the upper bottom layer 202 at the lower portion of the side wall 204 so as to prevent the lower bottom layer 203 from disengaging with the upper bottom layer 202, the cooking food in the utensil is scorched or burned at the circumferential boundary line between one layer wall 204a and double layer wall 204b of the side wall 204.

2. Controlling expansion of the heated air in the space 201 is accomplished through an aperture 205 formed in the rim of the lower bottom layer 204. Since the aperture 205 is normally opened, air in the space 201 is continously exhausted through the aperture 205 during heating the utensile. Therefore, the heated air can not fully store energy above a certain extent.

SUMMARY OF THE INVENTION

It is a principal object the present invention to provide a cooking utensil in which cooking food is not scorched or burned by heat transmitted from the bottom of the cooking utensile during cooking operation even if the utensile is over heated.

Other object of the present invention is to provide a cooking utensile which may comprise either a pot or frying pan, and which includes a heat retaining space between an inner member and an outer member of the cooking utensil throughout the bottom and some part of the side wall, and an intermediate member formed of material having height thermal conductivity, which covers not only the bottom portion but also the whole side wall between the inner member and the outer member.

Another objects are to provide an energy saving pot and frying pan with which food is speedly cooked with high efficiency in operation.

In accordance with the above objects of the present invention, there is provided a cooking utensil comprising an outer cylindrical member made of the first material having a top opening end; an intermediate cylindrical member made of the second material having a top opening and which is inserted into the outer member through the top opening end in a state that there is provided a heat retaining space between the bottom of the outer member and the bottom of the intermediate member; an inner cylindrical member made of the third material, which is welded with the intermediate cylindrical member and engaged with the flange of the outer member by bending the upper end of the inner member; an air passage formed vertically in a part of the circumference between the side walls of the outer member and the intermediate member, which is communicated with the space between the bottom of the outer member and the bottom of the intermediate member; and a thermal induction actuator mounted on the exit of the air passage, which selectively opens or closes the exit of the air passage according to temperature of air in the space so as to communicate the space with the atmosphere or not.

The bottom of the outer member is upwardly bulged in center portion thereof and has a plurality of quadrant notch lines which are concentrically arranged at some interval along the radial direction and four plane lines arranged between each quadrant notch lines along the radial direction.

So the cooking heat from heating means can be retained under the bottom of the outer member for a long time and a heating surface can be increased.

A inner bowl comprised of the inner member and the intermediate member has double layer structure that the bottoms of the inner member and the outer member are weld to each other by means of the high frequency induction welding method so as to prevent the bottom of the inner bowl from deformation by high heat.

The inner member is made of aluminum and the intermediate member is made of material having high heat conductivity such as aluminum, aluminum alloy or copper.

The thickness of the outer member, the intermediate member and the inner member is 0.5 mm~10 mm, 0.3 mm~10 mm and 0.2 mm~2.0 mm respectively.

The height of the space between the outer member and the intermediate member is 0.2 mm~20 mm at the center portion thereof and 3 mm~40 mm at the peripheral portion thereof.

The outer member and the inner bowl is tightly fitted between each side walls.

The upper end of the inner member is provided with a step for sitting a lid.

The upper rim of the inner member is bent outwardly and downwardly to cover the flange of the outer member.

The thermal induction activator is comprised of one of bimetal sense and plate spring which are actuated at predetermined temperature. The bimetal sense or a plate spring have an embossing fitted on the exit of the air passage at one end portion thereof. The other end of the thermal induction activator is engaged with the outer member by a bolt or a rivet.

According to another embodiment of the present invention, the notch lines can not be formed on the bottom of the outer member.

The bottom of the outer member is paralled with the bottom of the intermediated member so that the height of the heat retaining is constant throughout all of the bottom of the cooking utensil.

Accordingly, when the cooking utensil is heated by a heating means, firstly the outer member on which heat is directly transmitted is gradually heated and then the air in the space between the outer member and the inner member also is gradually heated. Nearly simultaneous instant, the intermediate member also is heated. Then, since the intermediate member is made of material having high heat conductivity, the heat transmitted to the intermediate member is speedly spread out all of the intermediate member, which has uniform temperature throughout the whole surface thereof.

Finally, the intermediate member transmits its heat energy to the inner member so that the food in the inner member is not scorched or burned during cooking operation, because the food is not only undirectly heated but also uniformly heated throughout all of the inner member.

Further features and advantages will be apparent from the following detailed description of the cooking utensil according to the present invention with reference to the attached drawing set forth by way of example, but not limited to them.

However, it should be understood that the detailed description and specific examples, while indicating preferred embodiment of the invention, are given by way of illustration only, since various changes and modification within the spirit and scope of the invention will become apparent to these skilled in the art from this detailed description.

DETAILED DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
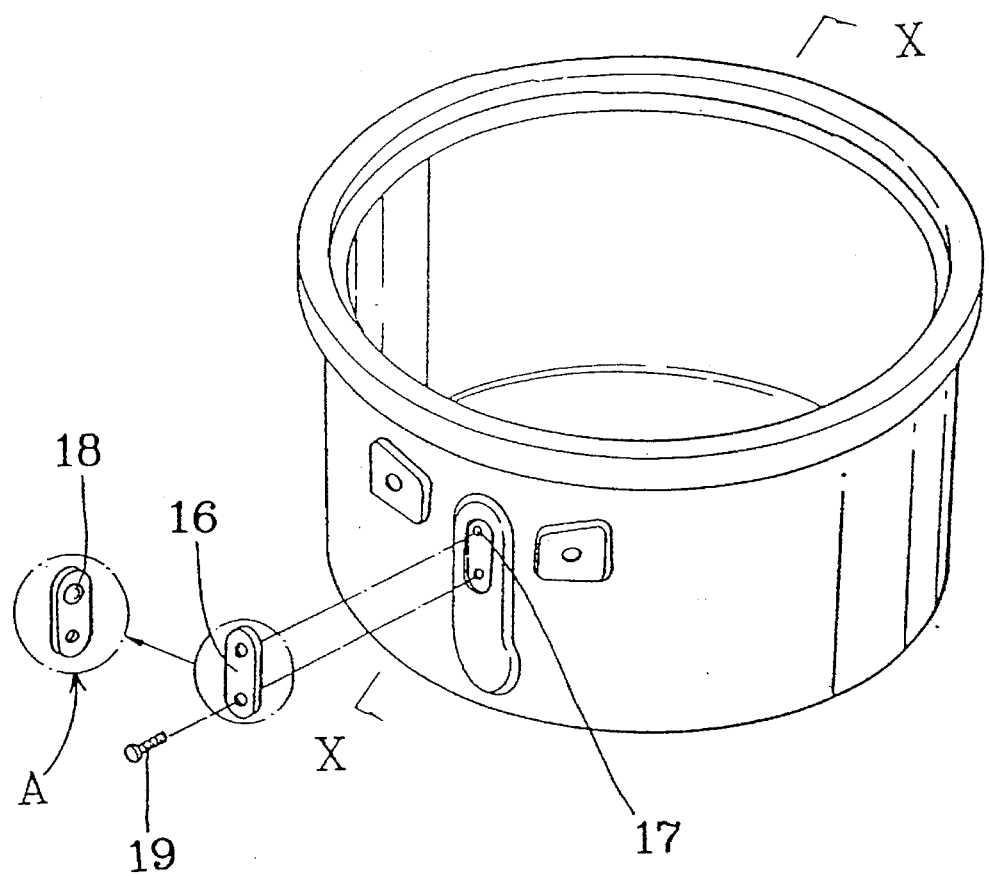
FIG. 1 is a perspective view of the first embodiment according to the present invention.

Referring to the drawing, a cooking utensil embodying this invention comprises an outer cylindrical member 10 having a top opening end, an intermediate cylindrical member 11 which is inserted into the outer member 10 through the top opening end in a state that there is provided a heat retaining space 12 between the bottom 10a of the outer member 10 and the bottom 11a of the inner member 11, and an inner cylindrical member 13 which is welded with the intermediate member 11 and engaged with the flange 10b of the outer member 10 by bending the upper rim 13b of the inner member 13.

The inner member 13 and the intermediate member 11 constitute an inner bowl 14 which is inserted into an outer bowl composed of the outer member 10. The bottom 13a of the inner member 13 and the bottom 11a of the intermediate member 11 are welded to each other by means of the high frequency induction welding method so as to prevent the bottom of the inner bowl from deformation by high temperature. The side walls of the inner member 13 and the intermediate member 11 are closely contacted to each other.

Figure 2:
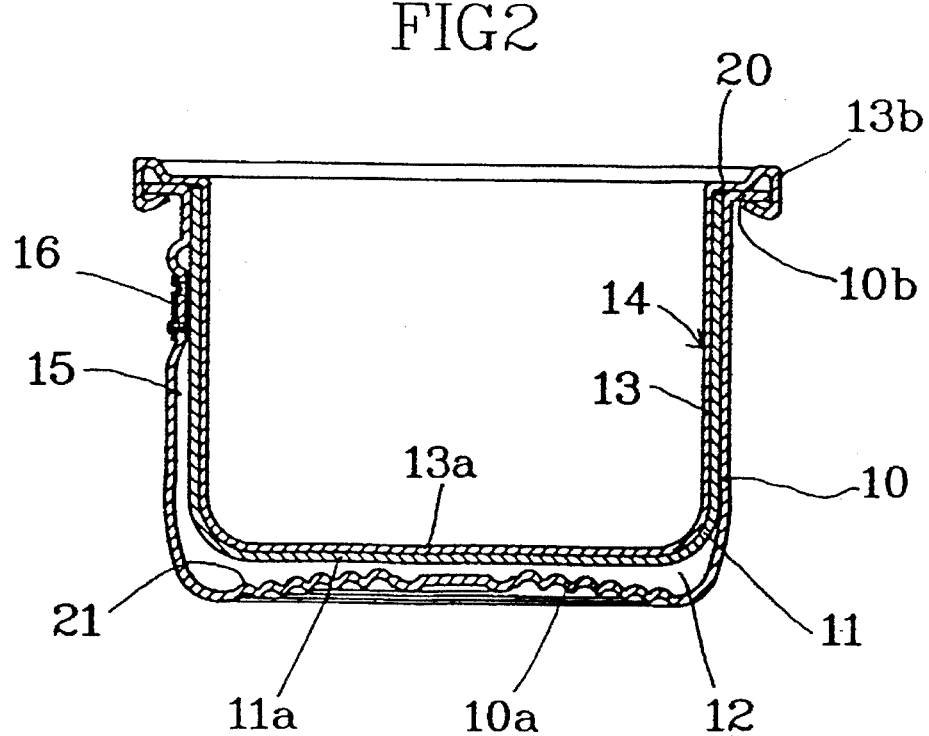
FIG. 2 is a section view taken along the line X—X in FIG. 1.
Figure 3:
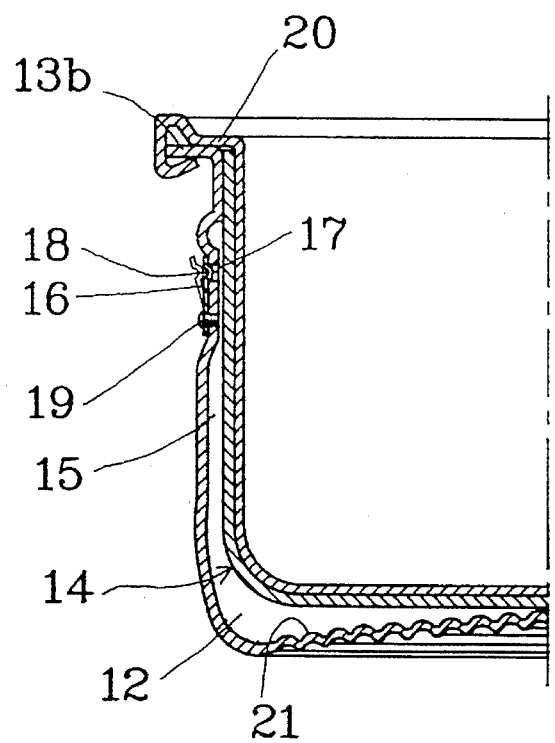
FIG. 3 is an enlarged section view of left-hand side in FIG. 2.
Figure 4:
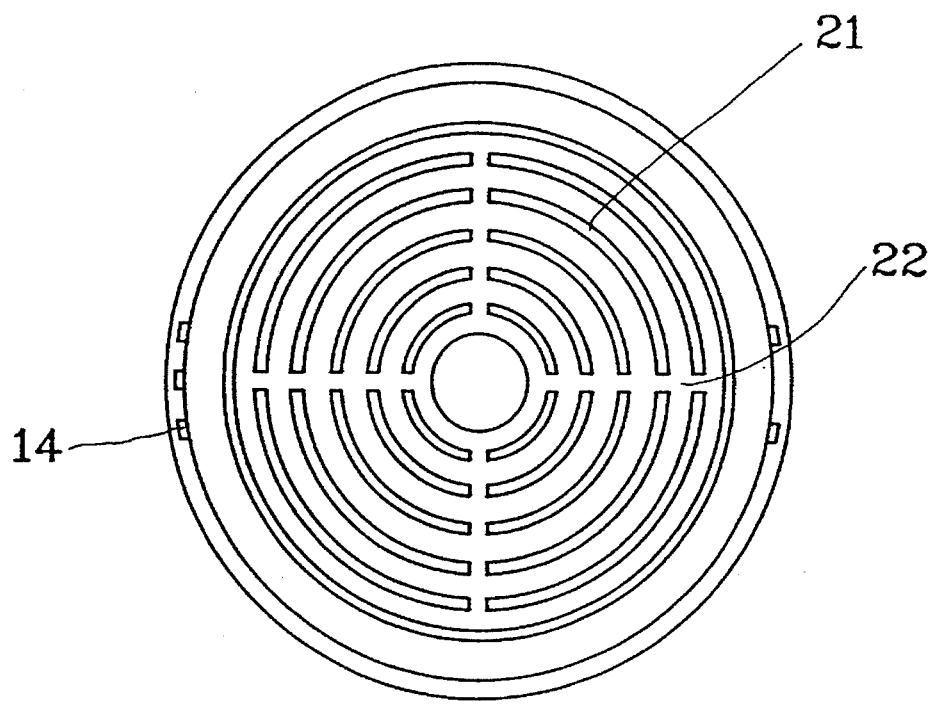
FIG. 4 is a bottom view of the first embodiment of the present invention.

The inner bowl 14 is tightly fitted into the outer member 10 so that the side wall of the inner bowl 14 is closely contacted with the side wall of the outer member 10 excepting an air passage 15 which is vertically formed in a part of the circumference between the sidewalls of the outer member 10 and the intermediate member 11, and communicated with the heat retaining space 12 between the bottom 10a of the outer member 10 and the bottom 11a of the intermediate member 11 as shown in FIG. 2 and FIG. 3.

A thermal induction actuator 16 is mounted on the exit 17 of the air passage 15. The actuator 16 opens or closes selectively the exit 17 of the air passage 15 according to temperature of air in the heat retaining space 12 so as to communicate the space 12 with the atmosphere or not.

The thermal induction actuator 16 comprises of one of a bimetal sense and a plate spring which are actuated at pre-determined temperature. The bimetal sense or the plate spring have an embossing 18 which can be fitted on the exit 17 of the air passage 15 at one end thereof in order to close or open the exit 17 according to the air temperature in the space 12. The other end of the thermal induction actuator 16 is fastened to the outer member 10 by means of a bolt 19 or a rivet.

The upper rim 13b of the inner member 13 is bent outwardly and downwardly to cover the flange 10b of the outer member 10. On the upper rim 13b of the inner member 13 a step 20 is provided for sitting a lid(not shown).

The bottom 10a of the outer member 10 may be upwardly bulged in the center portion thereof. And a plurality of quadrant notch lines 21 may be formed on the bottom 10a of the outer member 10. The quadrant notch lines 21 are concentrically arranged at same interval along the radial direction, and also four plane line 22 are formed to be arranged between each quadrant notch line 22 along the radial direction of the bottom 10a.

Figure 5:
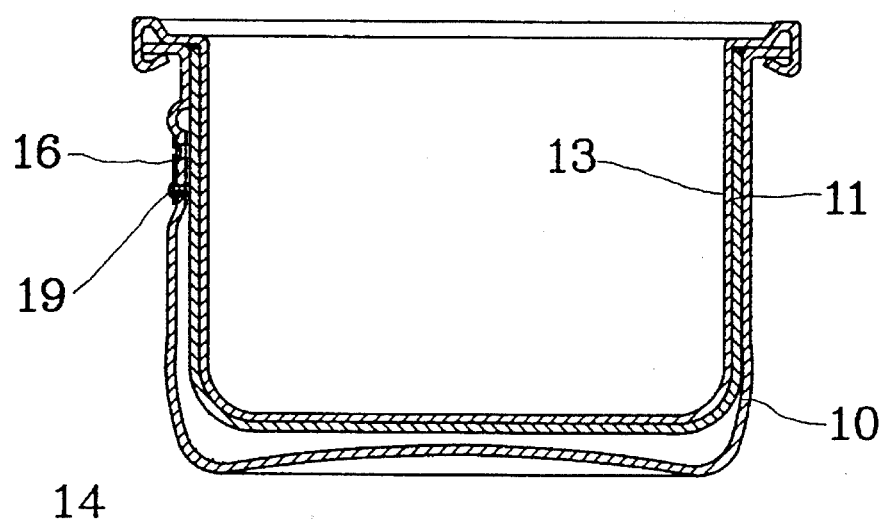
FIG. 5(A) is a vertical section view of the second embodiment of the present invention.
FIG. 5(B) is a vertical section view of the third embodiment of the present invention.
Figure 5:
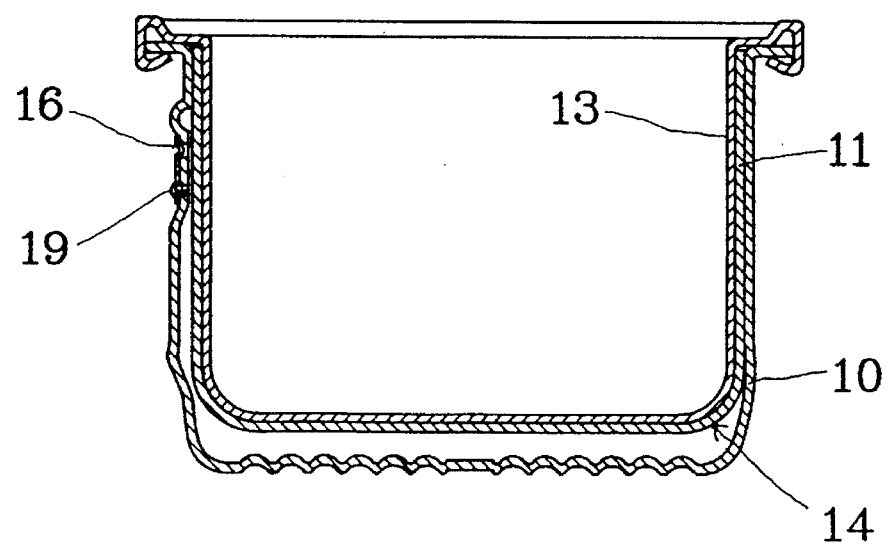
Figure 6:
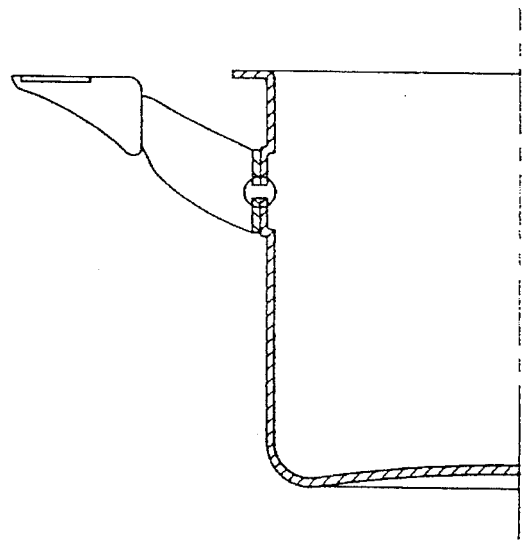
FIG. 6 is to show the structure that a handle is assembled to the outer member.

Furthermore, the contour of the bottom 10a of the outer member 10 may be plane as well as upwardly curved as shown in FIG. 5.

Then the notch lines 21 and the plane lines 22 can increase the heat contacting area under the bottom 10a of the outer member and can prevent the bottom 10a of the member 10 from deformation by high temperature.

Moreover the upwardly curved bottom 10a or the outer member 10 and a plurality notch lines 21 can increase the combustion efficiency of fuel, because the combusted gas is not directly exhausted and recombusted during moving along the contour of the upwardly curved bottom 10a of the outer member 10 and the notch lines 21.

The outer member 10 and the intermediate member 11 are made of material having high heat conductivity such as aluminum, aluminum alloy and copper, and the inner member 13 is made of material which is no harmful to human body and has high hardness such as stainless steel.

The thickness of the outer member 10, the intermediate member 11 and the inner member 12 is selectively determined within a range of 0.5 mm~10 mm, 0.3 mm~10 mm and 0.2 mm~20 mm respectively depend upon the size of the cooking utensil and operating condition in use.

The height "H" of the heat retaining space 12 between the outer member 10 and the intermediate member 11 is 0.2 mm~20 mm at the center portion thereof and 3 mm~40 mm at the peripheral portion.

The height "H" of the space 12 also is one of the important factors in the present invention and may be selectively determined within the above range according to the size of the utensil etc.

Figure 7:
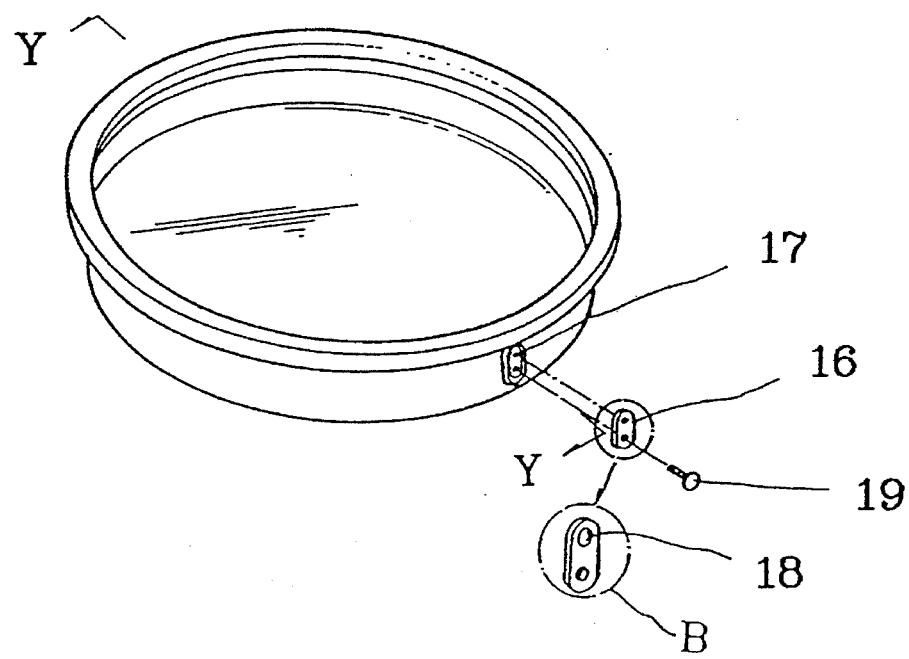
FIG. 7 is a perspective view of a frying pan according to the present invention.
Figure 8:
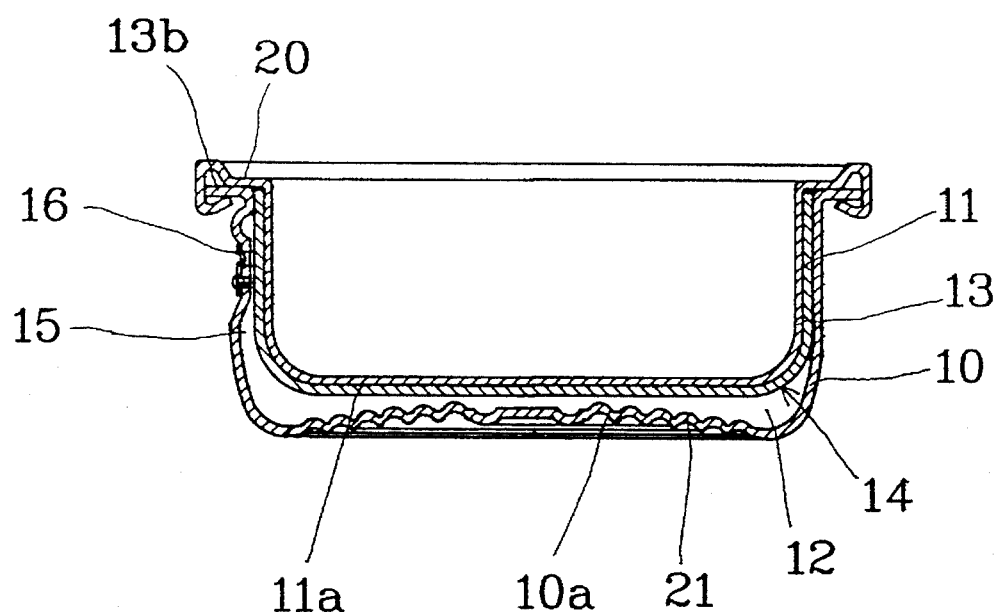
FIG. 8 is a section view taken along the line Y—Y is FIG. 7.
Figure 9:
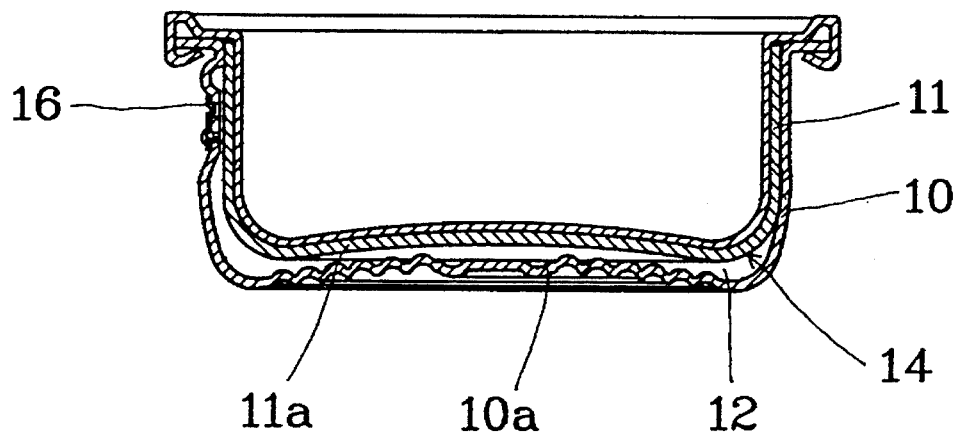
FIG. 9 is a vertical section view of other embodiment of the present invention.
Figure 10:
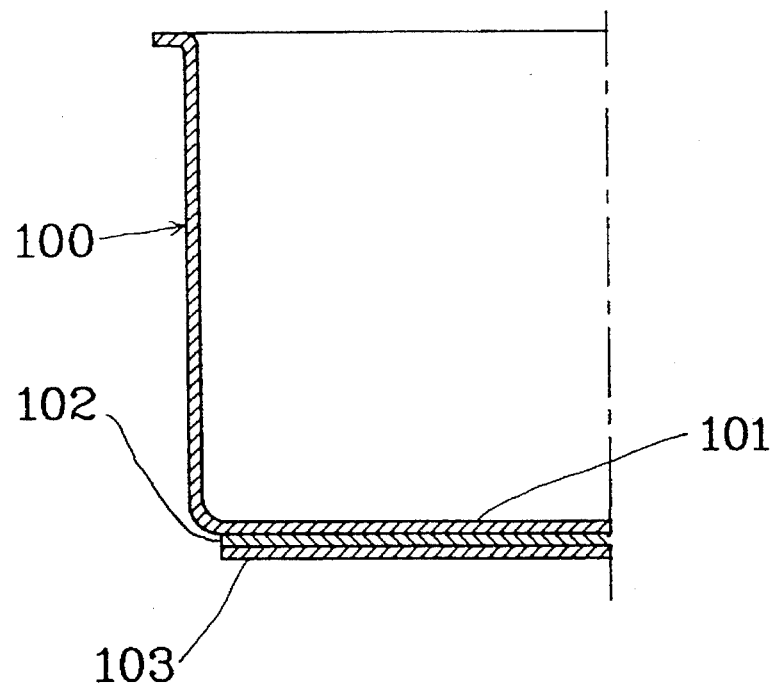
FIG. 10 is a vertical section view for showing the first prior art.
Figure 11:
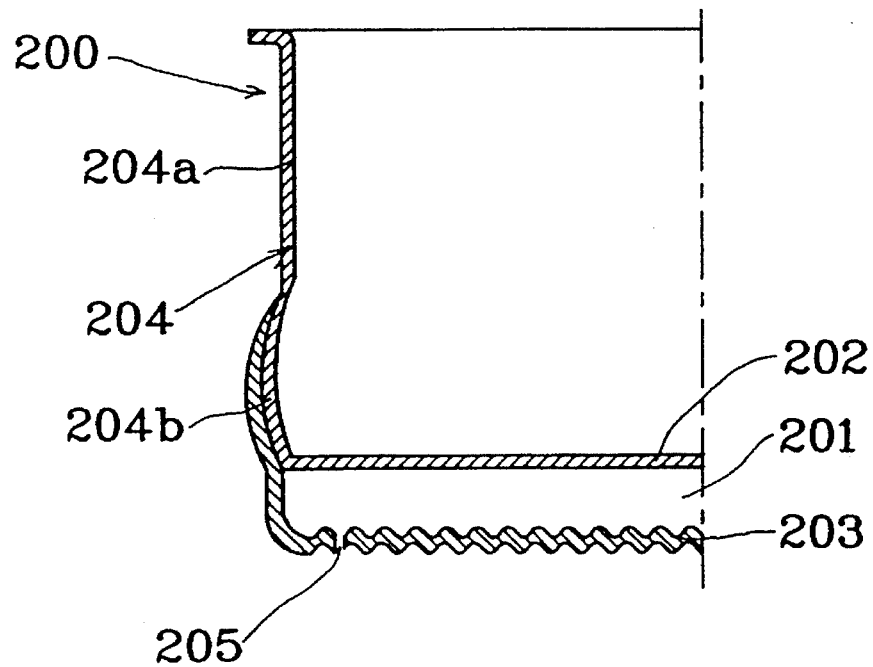
FIG. 11 is a vertical section view for showing the second prior art.

The height of the side wall of the cooking utensil in accordance with the present invention may be determined depend upon adaptation of the present invention. That is, if the utensil is adapted to a pot, the height of the side wall is relatively high as shown in FIG. 1 through FIG. 6. On the other hand, the utensil is adapted to a frying pan, the height of the side wall is low as shown in FIG. 7 through FIG. 9.

Operation

The operation of the present invention described as the above will now be described in accordance with the accompanying drawings.

When heat from a heating means is applied the undersurface of the outer member 10 in a state that food is put in the cooking utensil according to the present invention, the heated outer member 10 transmits heat energy to the air in the heat retaining space 12 between the outer member 10 and the intermediate member 11. Then the temperature of the air in the space 12 is gradually increases, at the same time, since the intermediate member 11 is made of materials having high heat conductivity, the heat energy of air in the space 12 is instantly transmitted to the intermediate member 11 and spread out throughout all of the member 11. Therefore, the temperature of the intermediate member 11 is constant at any point thereof, i.e. the temperature of the bottom 11a of the member 11 is to be same as that of sidewall of the member 11.

Finally, the heat energy of the intermediate member 11 is transmitted to the inner member 13. As a result, the inner member 13 can be simultaneously heated and all point of the member 13 become same temperature.

During the above procedure, if air temperature is increased above the pre-setting point, the thermal induction actuator 16 opens the exit 17 of the air passage 15 so that the expanded air in the heat retaining space 12 is exhausted to the atmosphere.

Therefore under the pre-setting point, the actuator 16 normally closes the exit 17 of the air passage 15 and the air in the space 12 is expanded during heating process so that the temperature of the air in the space is gradually increased and the heat energy of the air is transmitted to the intermediate member 11.

As described in the above, heat from the flame of heating means is not directed to the inner member 13 and heat is not focused at any specific position. Therefore the food in the inner member 13 is speedly boiled and not scorched or burned on the bottom surface of the inner member 13.

What is claimed is:

1. A cooking utensil comprising an outer member having a top opening end; an intermediate member which is inserted into the outer member through the top opening end in a state that a heat retaining space is formed between the bottom of the outer member and the bottom of the intermediate member; an inner cylindrical member which is welded with the intermediate member and engaged with the flange of the outer member by bending the upper end of the inner member; an air passage formed vertically in a part of the circumference between the sidewalls of the outer member and the intermediate member, which is communicated with the heat retaining space; and a thermal induction actuator mounted on the exit of the air passage, which selectively opens or closes the exit to the air passage according to temperature of air in the heat retaining space so as to communicate the heat retaining space with the atmosphere or not.

2. The cooking utensil according to claim 1, wherein the inner member is made of stainless steel, and the intermediate member and the outer member are made of one selected from the group of aluminum, aluminum alloy and copper.

3. The cooking utensil according to claim 1, wherein the thickness of the outer member, the intermediate member and the inner member is in a range of 0.5 mm~10 mm, 0.3 mm~10 mm and 0.2 mm~20 mm respectively.

4. The cooking utensil according to claim 1, wherein the bottom of the outer member has a plurality of quadrant notch lines which are concentrically arranged at same interval along the radial direction thereof and four plane lines arranged between each the quadrant lines along the radial direction.

5. The cooking utensil according to claim 1, wherein the height of the heat retaining space is 0.2 mm~20 mm at the center portion thereof and 3 mm~40 mm at the peripheral portion thereof.

6. The cooking utensil according to claim 1, wherein the bottom of the outer member is paralled with the bottom of the intermediate member so that the height of the heat retaining space is constant through out all of the bottom of the cooking utensil.

7. The cooking utensil according to claim 1, wherein the inner bowl comprising of the inner member and the intermediate member is tight fitted into the outer member in each side wall.

8. The cooking utensil according to claim 1, wherein the inner member further comprises a step for sitting a lid on the upper end of the inner member.

9. The cooking utensil according to claim 1, wherein the upper rim of the inner member is bent outwardly and downwardly to cover the flange of the outer member.

10. The cooking utensil according to claim 1, wherein the thermal induction actuator comprises of one of a bimetal sense and a plate spring which are actuated at predetermined temperature.

11. The cooking utensil according to claim 10, wherein the bimetal sense or the plate spring have a embossing fitted on the exit of the air passage at one end portion thereof and the other end portion is fastened on the outer member by means of a bolt or a rivet.

12. The cooking utensil according to claim 1, wherein the side wall of the utensil is high so as to be adapted to a pot.

13. The cooking utensil according to claim 1, wherein the side wall of the utensil is low so as to be adapted to a frying pan.

* * * * *